UNITED STATES PATENT OFFICE.

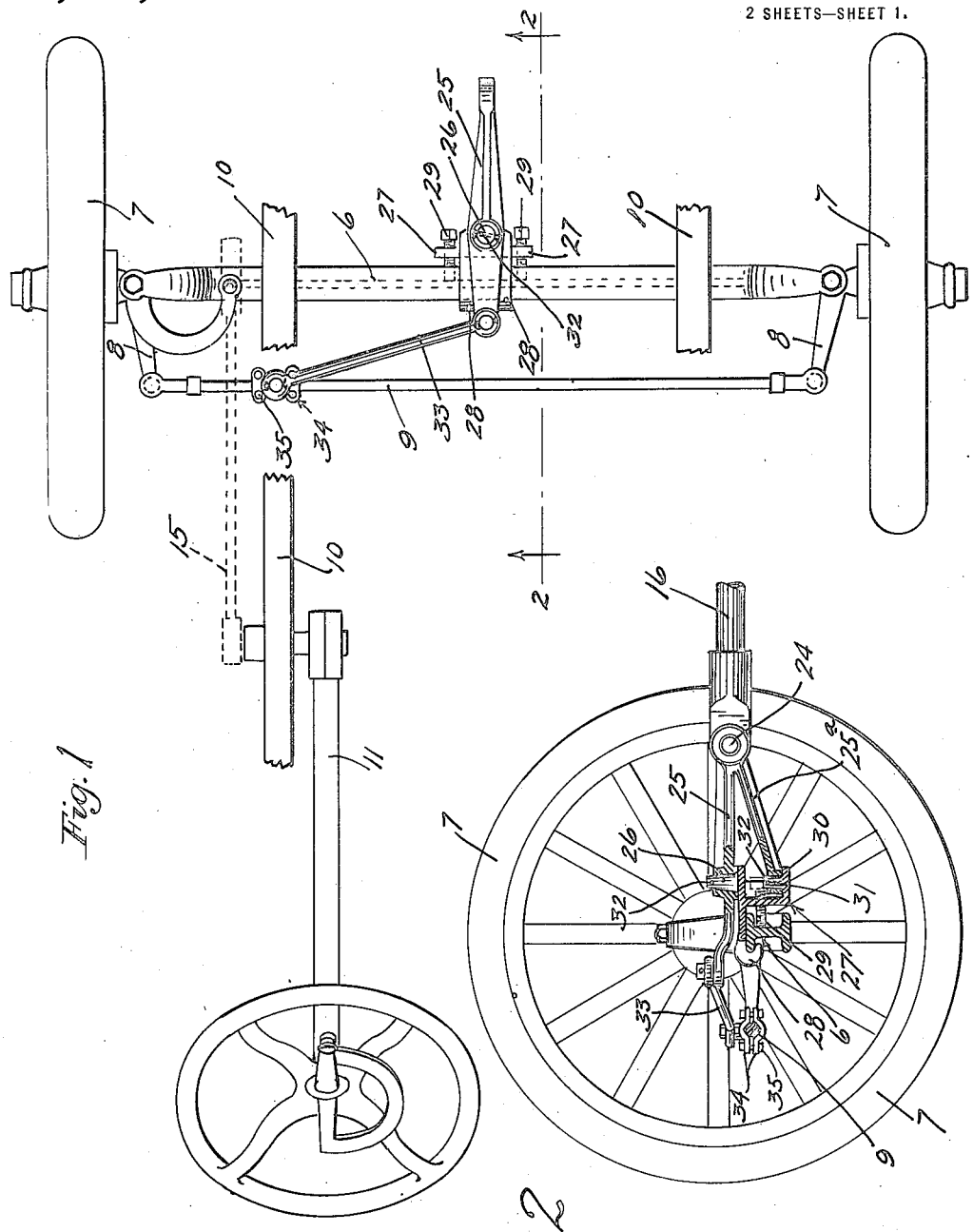

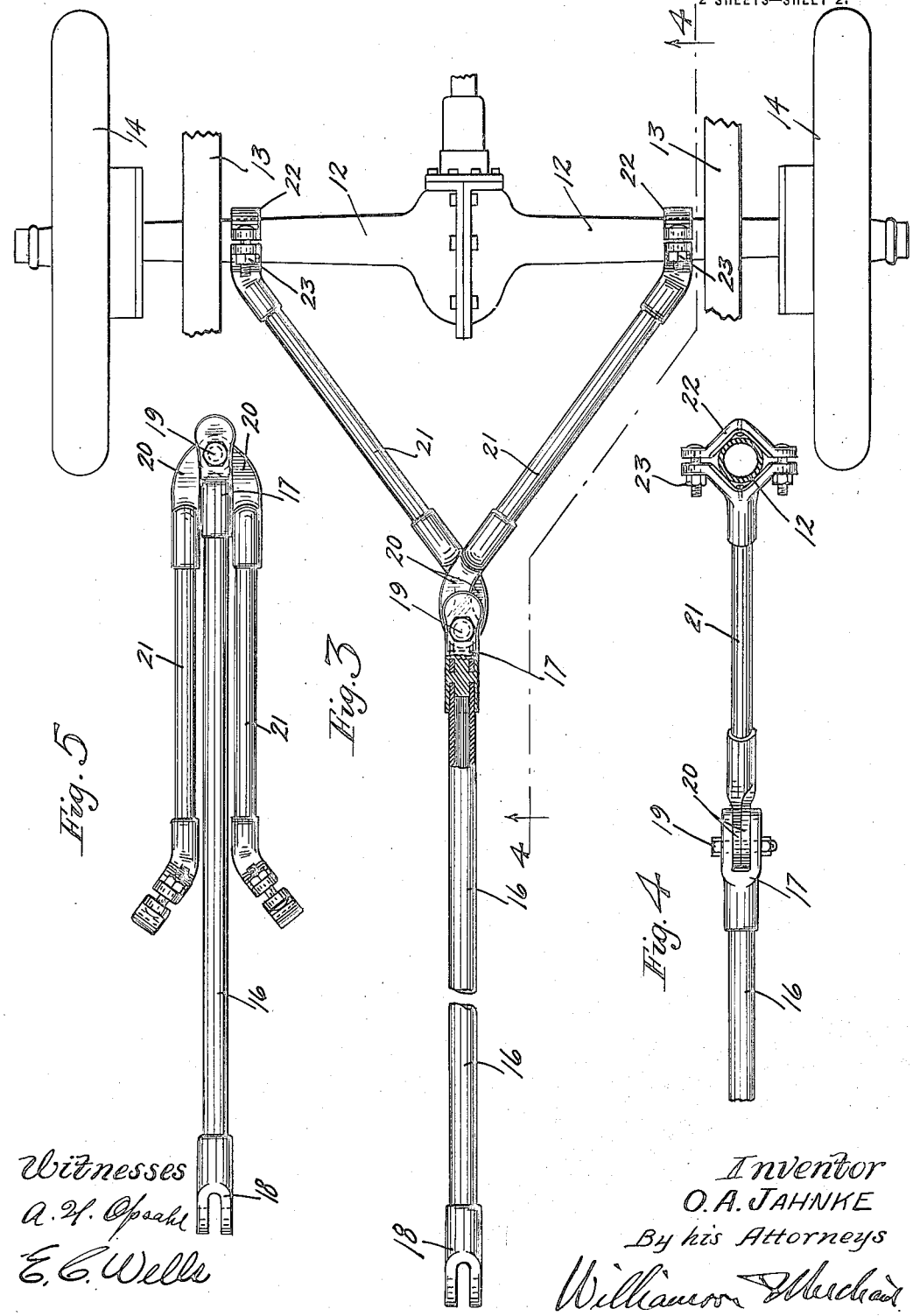

OTTO A. JAHNKE, OF INTERNATIONAL FALLS, MINNESOTA.

STEERING DEVICE FOR TOWING AUTOMOBILES.

1,372,818.  Specification of Letters Patent.  Patented Mar. 29, 1921.

Application filed April 20, 1918. Serial No. 229,676.

*To all whom it may concern:*

Be it known that I, OTTO A. JAHNKE, a citizen of the United States, residing at International Falls, in the county of Koochiching and State of Minnesota, have invented certain new and useful Improvements in Steering Devices for Towing Automobiles; and I do hereby declare the following to be a full, clear, and exact description of the invention, such as will enable others skilled in the art to which it appertains to make and use the same.

My invention has for its object to provide an extremely simple and highly efficient device whereby one automobile may be towed behind another and caused to trail. Generally stated, the invention consists of the novel devices and combinations of devices hereinafter described and defined in the claim.

There is a great demand for an efficient device of the above character so that one or more automobiles may be trailed behind a leader or pulling car and that two or more cars may be thus driven by one man. Where hauls were not very long, it has hitherto been a common practice to save freight charges by pulling the cars from the factory, but under the present traffic conditions incident to the war, it has become a matter of necessity to drive the cars from the factory to points far distant from the factory, and in such runs, the expense is proportionately large to the number of men employed in driving the cars. I have provided an extremely simple device for the above purpose which has been found efficient in actual usage. The device is illustrated in the accompanying drawings wherein like characters indicate like parts throughout the several views.

Referring to the drawings:

Figure 1 is a fragmentary view showing the front axle structure, steering connections and certain other parts of the automobile which may be assumed to be a Ford, but may, of course, be of any other make;

Fig. 2 is a section on the line 2—2 of Fig. 1;

Fig. 3 is a plan view showing the rear axle of the lead or pulling car and the steering attachment applied thereto;

Fig. 4 is a vertical section on the line 4—4 of Fig. 3; and

Fig. 5 is a plan view showing the draw-bar structure of the steering device folded up.

In Figs. 1 and 2, the numeral 6 indicates the front axle, the numeral 7 the front wheels, the numeral 8 the knuckles, the numeral 9 the knuckle connecting link, the numeral 10 a portion of the frame and the numeral 11 the steering post structure of the car that is to be towed.

In Figs. 3 and 4, the numeral 12 indicates a rear axle casing the numeral 13 the frame, and the numeral 14 the rear or traction wheels of the rear or pulling automobile.

When an automobile is to be towed, if it is of a character that has a reversible or semi-reversible steering mechanism, then the link connection 15, indicated by dotted lines in Fig. 1, should be removed or disconnected so that the front wheels of the towed machine may be freely moved by the automatic steering attachment.

This automatic steering attachment, as preferably constructed, is constructed as follows: The numeral 16 indicates a reach bar preferably of tubular form, provided at its front end with a forked head 17 and at its rear end with a forked head 18. The front end head 17, by means of a vertical pivot bolt 19, is pivotally connected to the lapping ends 20 of a pair of bracket forming arms 21 that are preferably also tubular in form. These bracket arms 21, at their front ends, are provided with divided clamping heads 22 connected by nut-equipped bolts 23 and arranged to embrace and to be rigidly clamped to the rear axle casing 12 of a lead or pulling machine, at points near to the side frames 13. When the arms 21 are thus rigidly secured to the axle casing, they will be held against vertical movements and their pivotal connection 19, with the reach bar 16 will be at a considerable distance at the rear of the rear axle and at a point transversely central of the wheels. The rear head 18, by means of a horizontal pivot bolt 24, is connected to the front end of a lever 25 which is of peculiar form. This lever, at its intermediate portion, has a hub pivotally mounted on a stud 26 on the anchor bracket 27. This anchor bracket 27 has a hook-like flange 28 that is engageable over the upper flange of the front axle 6 at the center thereof, and the said bracket is provided with laterally spaced set screws 29 which, when tightened, firmly clamp the said anchor bracket to the axle.

The anchor bracket is provided with a lower flange 30 provided with a pivot boss or hub 31 that is axially alined with the stud 26; and the lever 25 is provided with an oblique lower arm 25ª that is pivoted on the said stud 31. There is sufficient clearance between the upper end of the stud and the upper flange of the anchor bracket 27 to permit the lever 25—25ª to be lifted off from the studs 26 and 31 when cotters 32 are removed from said studs.

The rear end of lever 25 is pivotally connected to a short thrust link 33, which, at its free end, is pivotally connected to a clamping head 34.

This clamping head 34 is preferably a two-part structure provided with short nut-equipped bolts 35 by means of which it may be detachably but rigidly secured on the knuckle connecting steering link or cross rod 9.

In a horizontal direction, the lever 25 and reach rod 16 operate as a single lever pivoted on the stud 26 and are pivotally connected to the two-arm bracket 21. The rear end of lever 25 is approximately of the same length as the arms of knuckles 8 and the length of the reach is such that when the rear axle of the front or towing machine is given an angular movement in the one direction or the other, as it will be in turning a curve, the lateral swinging movement imparted to the bracket 21 at pivot 19, operating through the composite lever 25—16, will oscillate the front wheels of the towed or rear machine in a manner which will cause the wheels of the rear machine to trail or run in approximately the same track as the wheels of the front vehicle. The pivot at 24 will permit wheels of the two machines to adapt themselves to irregular roads. The central location of the reach or drawbar 16 gives a central pull on the rear vehicle and produces a like steering action in both directions.

When the steering device is detached, the arms 21 may be folded against the reach 16, as shown in Fig. 5, and this adapts the entire attachment to be packed in small space.

The described form of bracket-like front end of the lever 25 gives a strong vertical thrust support for the rear end of the reach, and moreover, the arrangement of studs thereon provides means for quick attachment and detachment of the lever 25. The device, as is obvious, may be quickly applied to a vehicle and quickly removed therefrom and is of small cost.

What I claim is:

A steering attachment for drawing one motor vehicle from another, comprising a lever supporting bracket having means for rigidly attaching the same to the front axle of the rear vehicle and provided with vertically spaced flanges with studs rising therefrom, of a lever having a main body portion and a prong pivotally mounted on the said studs, a link pivotally connected to the rear end of said lever and having means for attachment to the knuckle connecting cross rod of such vehicle, a reach pivotally connected to the front end of said lever for vertical pivotal movements but partaking of the horizontal pivotal movements of said lever, and a steering bracket having means for attachment to the rear axle structure of the front vehicle and having a pivotal connection to the front end of said reach.

In testimony whereof I affix my signature in presence of two witnesses.

OTTO A. JAHNKE.

Witnesses:
L. C. SEYBOLD,
T. J. DOTY.